US006629062B2

United States Patent
Coffey et al.

(10) Patent No.: US 6,629,062 B2
(45) Date of Patent: Sep. 30, 2003

(54) PERFORMANCE MONITORING IN A STORAGE ENCLOSURE

(75) Inventors: Aedan Diarmuid Cailean Coffey, Kilkenny (IE); Michael Lardner, Tuam (IE)

(73) Assignee: Richmount Computers Limited, Leopardstown (IE)

(*) Notice: Subject to any disclaimer, the term of this patent is extended or adjusted under 35 U.S.C. 154(b) by 221 days.

(21) Appl. No.: 09/900,203

(22) Filed: Jul. 6, 2001

(65) Prior Publication Data

US 2002/0010883 A1 Jan. 24, 2002

(30) Foreign Application Priority Data

Jul. 6, 2000 (IE) .......................................... S2000/0551
Sep. 7, 2000 (IE) .......................................... S2000/0709

(51) Int. Cl.[7] ............................. G06F 19/00; G06F 3/00
(52) U.S. Cl. ......................................... 702/188; 710/18
(58) Field of Search ............................... 702/188, 117, 702/118, 120, 122; 710/15, 18; 714/43, 47

(56) References Cited

U.S. PATENT DOCUMENTS

| 5,966,510 | * | 10/1999 | Carbonneau et al. .......... 714/44 |
| 6,018,809 | * | 1/2000 | Garrett .......................... 714/37 |
| 6,510,532 | * | 1/2003 | Pelly et al. .................... 714/43 |
| 6,513,074 | * | 1/2003 | Dimitri et al. .................. 710/1 |
| 2002/0044562 A1 | * | 4/2002 | Killen et al. ................. 370/406 |
| 2002/0046276 A1 | * | 4/2002 | Coffey et al. ................ 709/224 |
| 2002/0054477 A1 | * | 5/2002 | Coffey et al. ................ 361/686 |
| 2003/0051194 A1 | * | 3/2003 | Cabezas et al. ............... 714/43 |

* cited by examiner

Primary Examiner—Patrick Assouad
(74) Attorney, Agent, or Firm—Oppedahl & Larson LLP

(57) ABSTRACT

A bus analyser for analysing the operation of a bus to which a plurality of devices are connectable is disclosed. The devices are operatively coupled to a host device running a host application and the analyser is adapted to be housed in an enclosure which, in use, houses at least one of the devices. The analyser is arranged to extract data from the bus, process the extracted data; and communicate processed data to an environmental control and monitoring unit through a secondary communication bus.

7 Claims, 5 Drawing Sheets

PERFORMANCE MONITORING IN A STORAGE ENCLOSURE

RELATED APPLICATIONS

The invention herein disclosed is related to Irish application Ser. No. S2000/0710 filed on Sep. 7, 2000 entitled "Fibre Channel Diagnostics in a Storage Enclosure" naming Aedan Diarmuid Cailean Coffey et al. as inventors, now U.S. appl. Ser. No. 09/900,213, filed Jul. 6, 2001, published Apr. 18, 2002 as U.S. 20020046276; and to Irish application number S2000/0706 filed on Sep. 7, 2000 entitled "Data Gathering Device for a Rack Enclosure" naming Aedan Diarmuid Cailean Coffey et al. as inventors, now as U.S. appl. Ser No. 09/900,214, filed Jul. 6, 2001, published May 9, 2002 as 20020054477.

FIELD OF INVENTION

This invention relates to an analyser of the performance of a bus included within a storage enclosure.

BACKGROUND OF INVENTION

Many types of peripheral devices can be interfaced to digital computers, of which, typical examples include mass storage devices, used by computers to store and retrieve information. Each type of peripheral requires a unique or device specific, interface. The American National Standards Institute has approved X3.131-1986, designated the Small Computer Systems Interface or SCSI, that allows a computer system to connect, to a plurality of devices, or SCSI targets, using high-level device independent commands.

Increasing demands on host computers and networks have required that data integrity and availability be of utmost importance. However, system performance limitations may be introduced as a result of inefficient system configuration, e.g., where a legacy device on the SCSI bus determines the overall bus speed. In such situations, it is clearly of benefit for a systems analyst to be able to monitor the performance of the network and optimise its configuration and/or diagnose faults.

Conventional analysers of SCSI bus performance are large and expensive stand-alone devices, which are usually only connected to a SCSI bus, when it is suspected that a problem exists thereon. Such stand-alone SCSI bus analysers also provide detailed analysis of bus traffic at resolutions as low as 4 nS, in addition to a wide range of user-selectable capture modes and triggering options.

DISCLOSURE OF INVENTION

The present invention provides a bus analyser for analysing the operation of a bus to which a plurality of devices are connectable, said devices being operatively coupled to a host device running a host application, said analyser being adapted to be housed in an enclosure which, in use, houses at least one of said devices and comprising:

means for extracting data from the bus, means for processing extracted data; and means for communicating processed data to an environmental control and monitoring unit through a secondary communication bus.

The invention extends the functionality of the system environmental control and monitoring unit to encompass an analysis of the bus itself, and by using the communication facilities of the monitoring unit, the footprint of the analyser can be made such that it can be housed within the enclosure and even with a card incorporating the control and monitoring unit itself.

A preferred embodiment provides a SCSI bus analyser designed to be sufficiently small and inexpensive to be included directly within a SCSI enclosure thereby enabling continuous on-line monitoring of the SCSI bus and the provision of an early warning system of SCSI bus performance degradation.

Preferably, the analyser does not provide as detailed an analysis of the SCSI bus performance as a conventional stand-alone SCSI analyser, however the invention does provide sufficient information to enable a network analyst to perform a status check of the system. Further, the invention preferably also provides information on issues which may assist the network analyst in fine-tuning the configuration of the network such as, which devices on the SCSI bus are most active over a given period of time and rates of data transmission and error messaging.

Preferably, the analyser fits on a single chip as opposed to the multiple chips and cards in existing stand-alone systems SCSI analysers.

Preferably, the monitoring unit comprises an Enclosure Services processor communicating with the bus controller by methods including the SCSI Enclosure Services (SES) or SCSI Access Fault Tolerant Enclosure (SAF-TE) protocols. The SES processor includes facilities for SCSI bus monitoring by the addition of:

a control page to enable a user to specify the levels of analysis of bus performance required; and a status page containing processed data results from the analysis performed by the bus analyser.

BRIEF DESCRIPTION OF THE DRAWINGS

The features and advantages of the present invention will become apparent from the following description of the invention, taken together with the accompanying drawings, in which.

STRUCTURAL OVERVIEW

Figure 1:
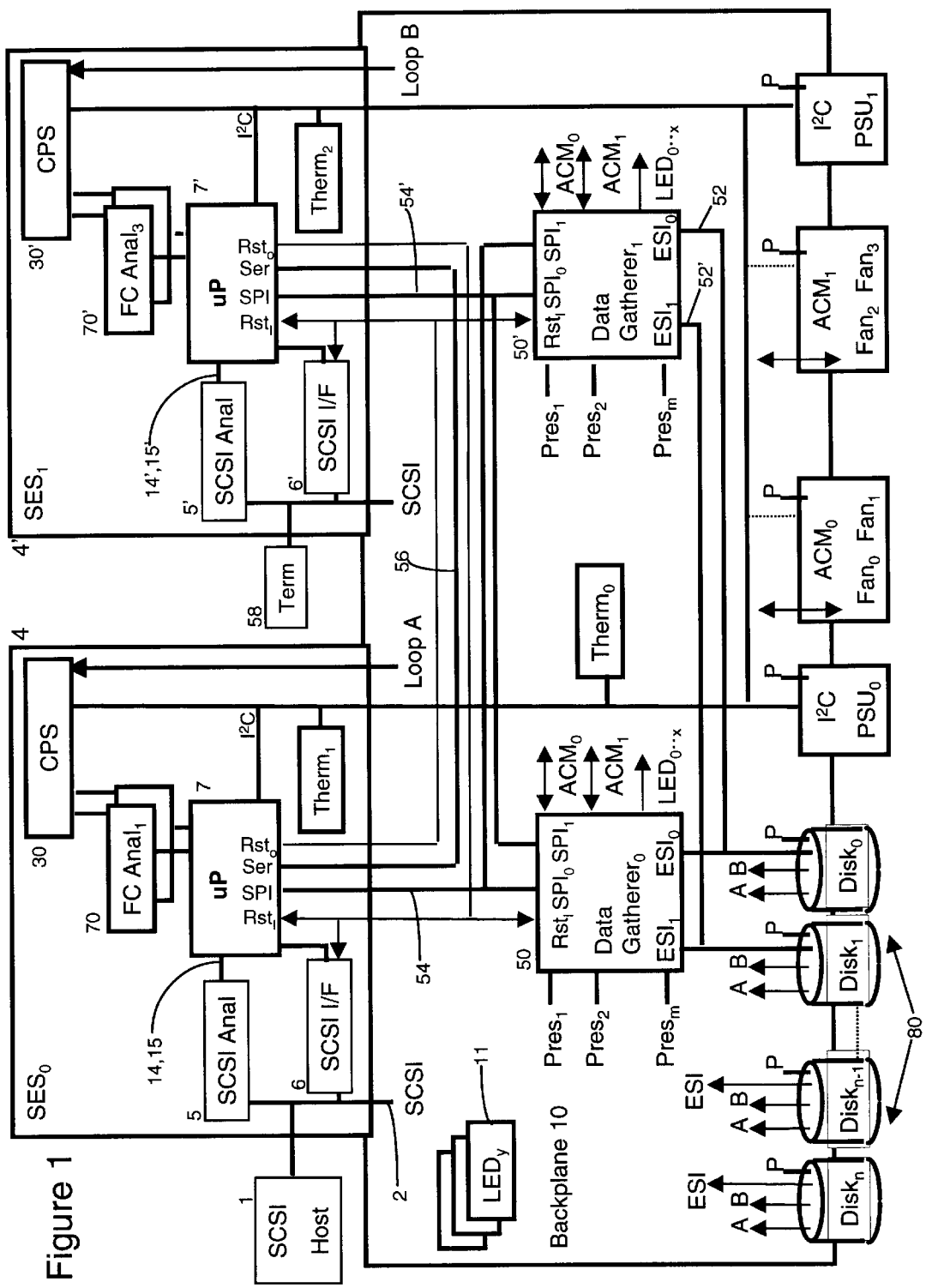
FIG. 1 is a block diagram showing a broad overview of a SCSI Analyser and the manner in which it relates to other elements in an integrated data gathering system.

FIG. 1 is a block diagram showing a broad overview of a SCSI Analyser 5 and the manner in which it relates to other elements in an integrated data gathering system. The overall operation of this system is described in co-pending application entitled "Data Gathering Device for a Rack Enclosure" naming Aedan Diarmuid Cailean Coffey et al. as inventors, now pending as U.S. appl. Ser. No. 09/900,214, filed Jul. 6, 2001, published May 9, 2002 as 20020054477.

In FIG. 1, the SCSI analyser (5) is located on a SCSI Enclosure Services (SES) processor board (4) which plugs into a backplane (10) for a rack enclosure. Nonetheless, it will be seen that the analyser may also be located on the back-plane (10) or wherever else in the integrated data gathering system as would enable the analyser to be on the SCSI bus (2).

Figure 2:
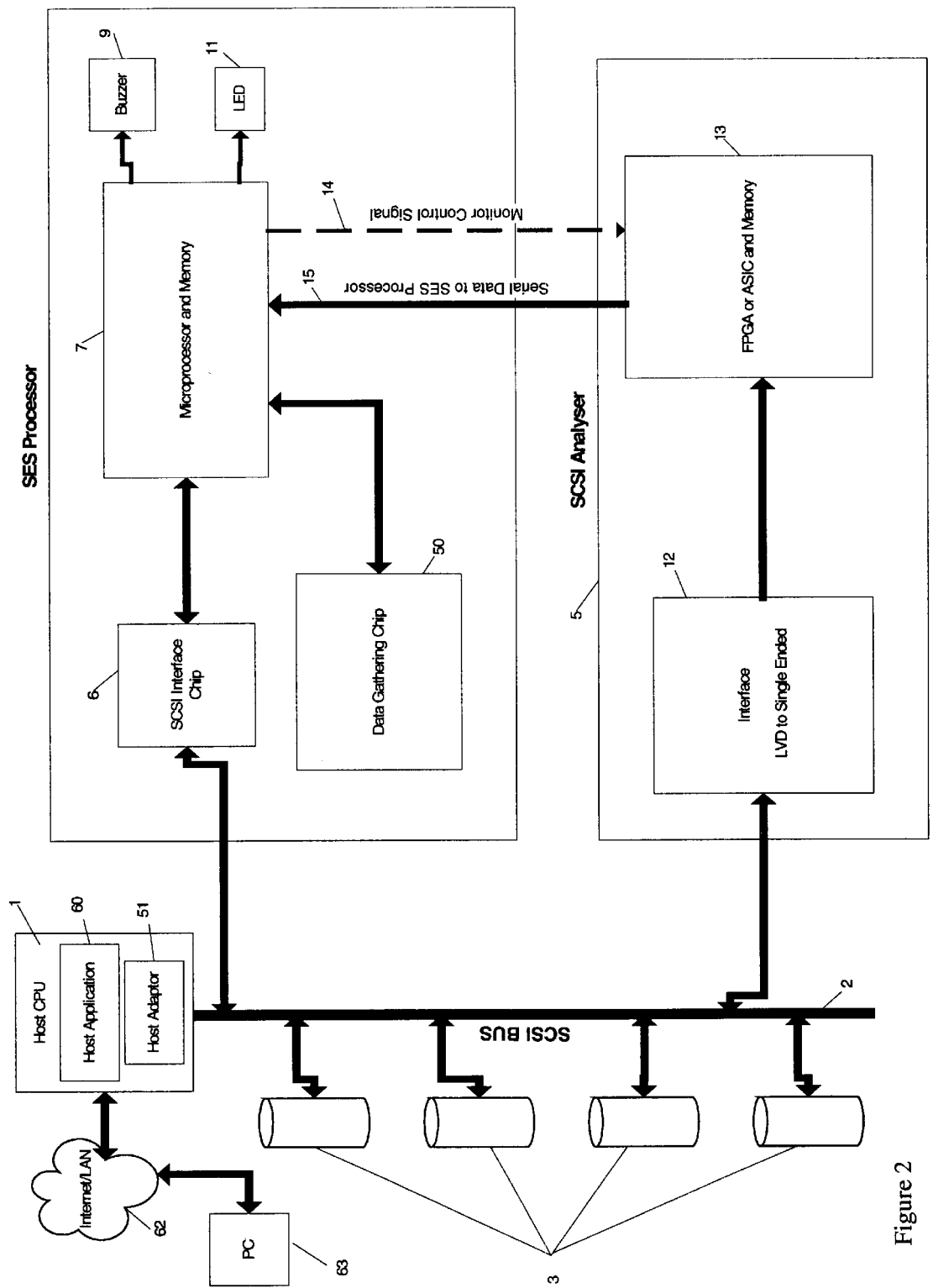
FIG. 2 is a block diagram showing more detail of the SCSI Analyser and a broad overview of the manner in which it relates to other elements in an integrated data gathering system for a SCSI bus.

FIG. 2 shows a more detailed view of the SCSI analyser (5) according to a preferred embodiment of the invention and the manner in which it integrates into an existing storage system including an environmental monitoring and control processor (7) incorporated in the processor board (4).

The embodiment relates to an analyser which exists in a system which is comprised of a plurality of disks (3) which are logically and electrically connected by a parallel SCSI bus (2), thereby forming a Redundant Array of independent Disks (RAID) or alternatively Just A Bunch Of Disks (JBOD). The array of disks is accessible by a Host CPU (1) via a Host Adaptor (51). Software is resident on the Host CPU which acts as an interface between the Host CPU (1) and the array of disks enabling the Host CPU's (1) operating system to view the array of disks as a single logical disk. The Host CPU (1) is itself accessible by a plurality of PCs (63) through a Local Area Network (LAN) or the Internet (62).

Since the embodiment involves the monitoring of commands and data on a SCSI bus, based on the detection of changes in the phase of the bus, it is useful at this point to briefly discuss how data and commands are transmitted on a SCSI bus and how the behaviour of the bus can be decomposed into a series of phases.

There are many different SCSI hardware bus specifications namely, SCSI-1, SCSI-2 and SCSI-3, which differ according to a number of parameters including, the speeds at which buses carry data and the number of bits which they carry in parallel. Further SCSI classifications are based on the methods of data transfer on the bus (synchronous or asynchronous) and the type of electrical signals carried on the bus, (single-ended (SE) and differential).

For the purposes of example, the signals transmitted by the standard 8-bit wide SCSI-2 bus will be described, however, this should not be seen as limiting the scope of the invention to a particular hardware specification. The 8 bit wide SCSI-2 bus has 18 signals 9 of which are used to initiate and control transactions between devices on the SCSI bus and are known as the control lines and 9 are used for data transfer (8 data bits plus a parity bit). The control lines include the busy line (/BSY), the select line (/SEL), the control/data line (/C/D), the input/output line (/I/O), the message line (/MSG), the request line (/REQ), the acknowledge line (/ACK), the attention line (/ATN) and the reset line (/RST).

The transfer of data or control signals over the SCSI bus takes place in eight phases. A SCSI bus phase is an interval of time in which certain signals are allowed or expected and others are not. For each bus phase there is a set of allowable phases that can follow, the transition from one phase to another being directed by control signals.

One of the allowable sequences of phases and the activities conducted within each phase will be described by reference to a simple example, namely the process of the host (51) reading a block of data from a disk (3) via the SCSI bus (2). An initiator is a device that triggers a task on the SCSI bus and a target is a device that carries out the task. Hence in the example to be described below, the initiator is the host and the target is the disk.

The sequence of phases corresponding to the example commences with a Bus Free Phase during which the initiator checks the bus busy line in order to determine whether or not the bus is under the control of another device. When the line indicates that the bus is free, the bus enters an Arbitration Phase in which the initiator sends a control signal to set the bus into a busy state and sends its own ID number out to the bus, effectively stating that it wishes to take control. If there is more than one device desiring to use the bus at the same time, all such devices assert the busy signal and put their SCSI ID onto the bus. The bus then arbitrates allowing the device with the highest priority rating (highest SCSI ID) to take control.

After gaining control of the bus, the successful initiator will select a target device with which to communicate in a Selection Phase. The Selection Phase may possibly be followed by a Reselection Phase that allows a target device to be reconnected to an initiator after having disconnected from the bus. The device selected then takes control of the data interchange, and will remain in control until the end of the exchange. During a Message Out Phase a target sends or receives information concerning the SCSI bus protocol. During a Command Phase the target asks the initiator for a command. The initiator responds with the command block to, for example, read 10 blocks from the start of block 5. The target acknowledges and translates the logical block numbers to absolute sectors, seeks and reads the sectors. The target may then perform error correction and during a Data Phase transmits the data with handshake acknowledgement. When the data transfer is finished the target requests that status information be sent to the initiator during a Status Phase and transmits a status report. If the status is good and the data does not have to be retransmitted then during a Message Phase the target requests to send a message and reports completion.

It will nonetheless be seen that the invention is equally applicable to all versions of SCSI bus including the 16 bit low voltage differential (LVD) standard (i.e. 9 control signals and 9 data signals), the 32 bit LVD standard (i.e. 9 control signals and 18 data signals).

Turning now to the SCSI analyser (5) according to a preferred embodiment of the invention. This serves as an adjunct to a conventional main storage system monitor, a SCSI Enclosure Services (SES) Processor (7). The SCSI Enclosure Services (SES) Processor (7) of the preferred embodiment provides online monitoring and control of variables predominantly associated with the enclosure environment (e.g. temperatures at different locations in the enclosure, fan speed, power supply voltages and currents and presence/absence of I/O controls and loop relay circuits in the case of fibre channel arbitrated loop). The SES Processor (7) is comprised of a microprocessor and memory which communicates bi-directionally with the SCSI bus (2) via a SCSI interface chip (6). Communication between the SES Processor (7) and the Host CPU (1) is according to a SES protocol. The ANSI SCSI-3 Enclosure Services (SES) protocol documents all the commands and parameters necessary for soliciting basic device status from storage enclosures. SES provides SCSI SEND DIAGNOSTIC and RECEIVE DIAGNOSTIC RESULTS commands to query a device. SES may be used to retrieve power supply status, temperature, fan speed, UPS and other parameters from both SCSI and proxy-managed non-SCSI devices. Further details of the SES protocol can be obtained from SES SCSI-3 Enclosure Services Command Set (SES) Rev. 8b, (NCITS 305-199x, T10/Project 1212-D/Rev. 8a)

The SES processor further comprises a data gathering chip (50) which communicates directly with each attached peripheral device (3). Warnings are given to operators by the SES Processor via buzzers (9) and LEDs (11) when a given environmental variable strays from its recommended operating range. Warning signals are also returned to the host computer (1) via the SES processor (7), thereby enabling the host computer to take further remedial action.

The SCSI analyser is user-programmable to obtain different types of analytical information relating to the performance of the SCSI bus. Such information is obtained via software (for example Vision), which packets the configuration requirements of the user into a form which can be interpreted by the SES processor (e.g. configuration pages). On receiving this information, the SES processor determines the appropriate destination for the configuration commands and transmits it to the destination in the appropriate form.

Similarly, information from the analyser is transmitted to the SES processor as, for example, a status page, and thence to Vision (or other similar software) on the PC and displayed to the user in a more accessible format.

The necessary data for the configuration of the SCSI analyser, resulting from the user's program, is transmitted to a SCSI analyser processor (13) via the SES Processor (7) as a Monitor Control Signal (14). The SCSI analyser (5) acts as a passive device on the SCSI bus (2), sampling data from the SCSI bus (2) via a Low Voltage Differential (LVD)/Single Ended (SE) interface (12). The SCSI analyser (5) then transmits the sampled data to a Field Programmable Gate Array (FPGA) or an Application Specific Integrated Circuit (ASIC) (13), wherein such chip performs filtering on the incoming data, stores it temporarily in the memory and transmits the resultant to the SES Processor microprocessor (7).

To reduce data transfer requirements, the SCSI analyser uses transitional storage methods, storing bus signals only when changes occur. This prevents the data buffers in the SCSI analyser memory (13) from overflowing during long periods of bus inactivity.

Since it is not the objective of the SCSI analyser to record data transitions during the Data Phases, the SCSI analyser operates at 40–50 ns resolution. During Data Phases, the analyser operates in asynchronous mode, recording only the number of bytes transmitted during a Data Phase and not the data itself. The recorded data is transmitted to the SES Processor as Serial Data to SES Processor (15). The Serial Data to SES Processor is transmitted though a two wire I²C link. Alternatively, RS232, Industry Standard Architecture (ISA) or Serial Peripheral Interface (SPI) protocols could be used. On reaching the SES processor, the Serial Data to SES Processor is reported to the host application (60) resident on a Host CPU (1), using the SES protocol, over the SCSI bus (2). The recorded data is then transmitted from the Host CPU (1) to, for example, an attached PC (63).

Detailed Structural Description of the SCSI Analyser

Figure 3:
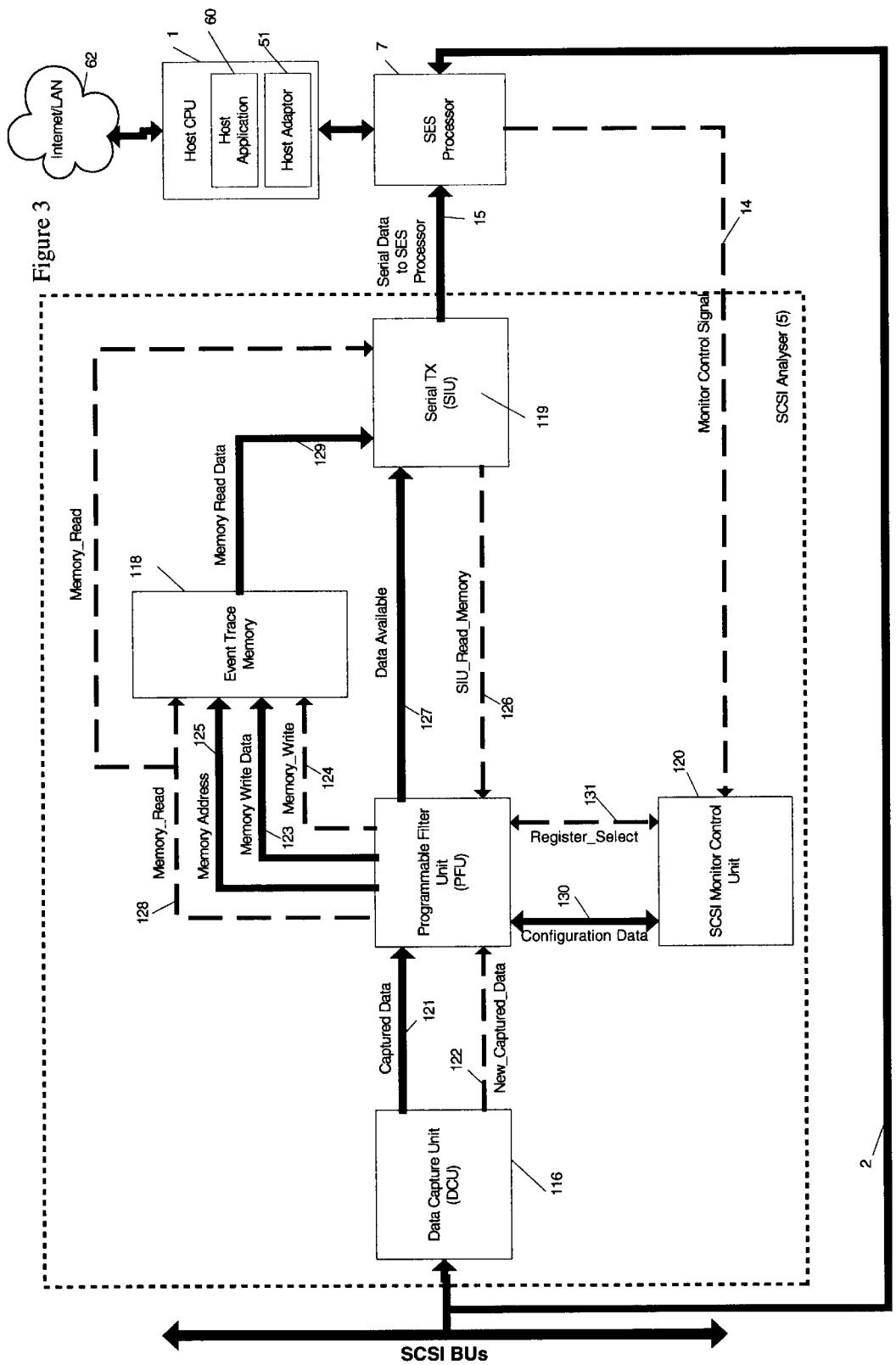
FIG. 3 is a block diagram showing a more detailed view of the SCSI analyser and its components

As seen in FIG. 3, the SCSI analyser is comprised of a Data Capture Unit (DCU) (116), a Programmable Filter Unit (PFU) (117), a Serial Interface Unit (SIU) (119), an Event Trace Memory (118) and a SCSI analyser Controller (120). The DCU (116) samples data from the SCSI bus (2) and provides a very detailed summary of activity on the bus including details of all the commands issued and the rate of data transmission (bytes/sec). The summarised data provided the by DCU (116) is seen in the figure as the data entitled Captured Data (121). The Captured Data (121) is transmitted to the PFU (117) along with a control signal, shown in the figure as New_Captured_Data (122), informing the PFU (117) of the presence of new incoming summary data.

The PFU (117) performs further analysis of the data received from the DCU (116), by determining which elements of the Captured Data (121) correspond to those analytical performance-related variables required by the user. The PFU (117) may also calculate further performance-related statistics from the Captured Data (121) as programmed by the user. Such data, shown in FIG. 3 as Memory Write Data (23), is then transferred to the Event Trace Memory (118). Such activity is achieved by the transmission of three signals, namely, a control signal informing the Event Trace Memory (118) of the presence of incoming data (shown in the figure as Memory_Write (124)), a data signal conveying the address in the Event Trace Memory (118) to which the incoming data should be written (shown in the figure as Memory Address (125)) and a data signal containing the Memory Write Data (123) itself.

The data maintained by the Event Trace Memory (118) is then passed in parallel to the SIU (119) as Memory Read Data (129) and is from there serially transmitted to the SES Processor (7) (as Serial Data to SES Processor (15)). This represents a bi-directional communication between the SES Processor (7) and the SCSI analyser (5), wherein the SES Processor (7) transmits user-defined configuration commands to the SCSI analyser (5) and the SCSI analyser (5) transmits captured filtered data to the host application (60) through the SES Processor (7).

Figure 4:
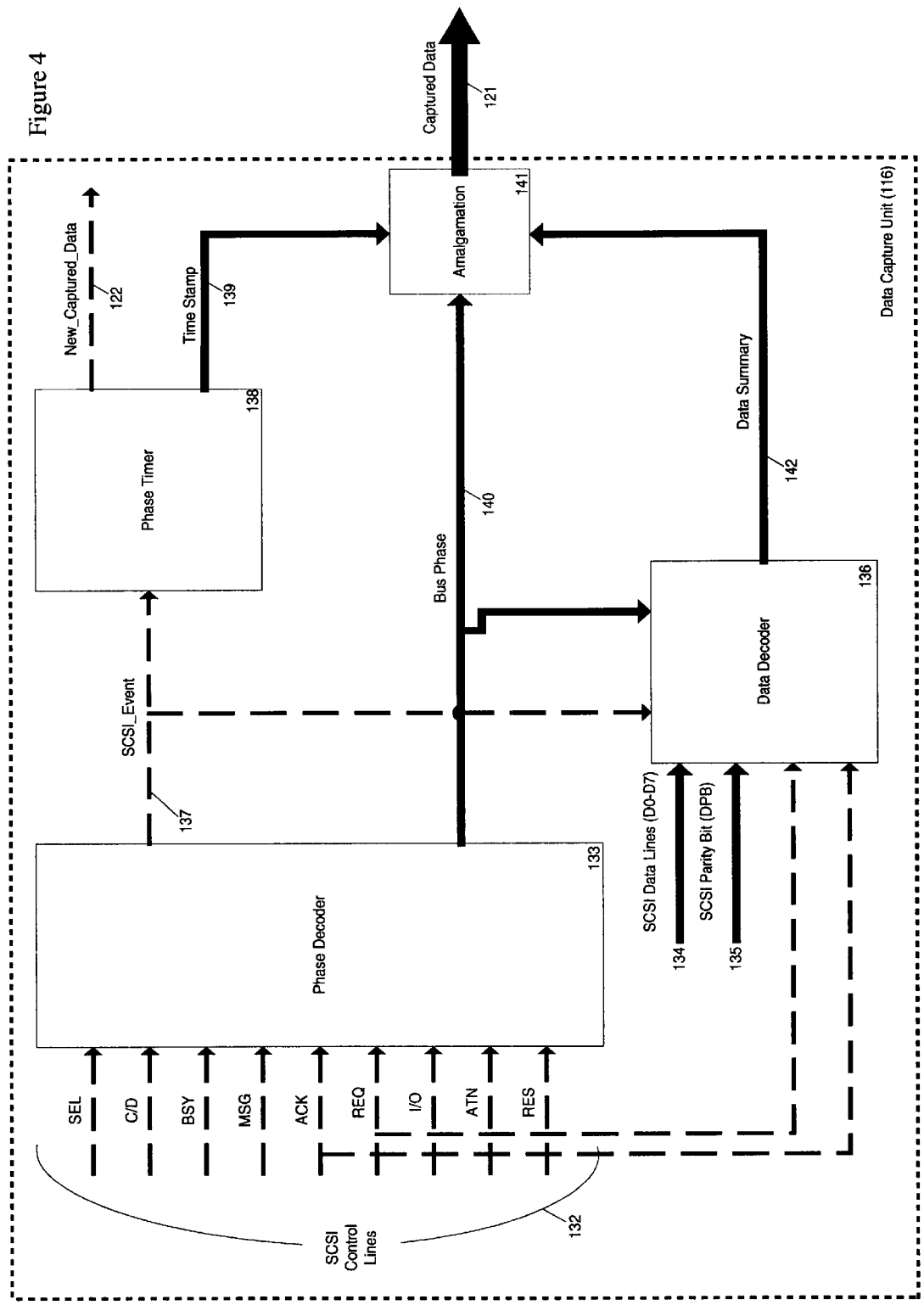
FIG. 4 is a block diagram of the Data Capture Unit (DCU) of the SCSI analyser

FIG. 4 shows a more detailed depiction of the DCU wherein it can be seen that signals from SCSI control lines (132) enter a phase decoder (133) and SCSI data lines (134) and a parity bit (135) enter a data decoder (36). The DCU (116) samples transitions on the SCSI bus control (132) and data (134) lines and determines the current bus phase based on the states of the control signals. The detection of a bus reset or a change in the bus phase results in the generation of a SCSI_Event (137) control signal by the Phase Decoder (133) and details of a resulting Bus Phase (140). The SCSI_Event Control Signal (137) is transmitted to both a Phase Timer (138) and the Data Decoder (136) and the identified Bus Phase (140) is transmitted to the Data Decoder (136) and a data amalgamating process (141).

The Phase Timer (138) generates a Time Stamp (139) and the New_Captured_Data control code (122) in response to the received SCSI_Event control code (137). It is necessary for the SCSI bus (2) to be in its Data Phase for the Data Decoder (136) to be able to calculate the number of data bits transferred per second. Consequently, it is necessary for the Data Decoder (136) to be notified that the SCSI bus (2) is in its Data Phase, before the Data Decoder (136) can start its calculations. Such notification is achieved by transmitting information to the Data Decoder (136) indicating both the change of phase (i.e. the SCSI_Event (137)) and the resulting Bus Phase (140). The rate of data transmission as calculated by the Data Decoder (136) is transmitted as a Data Summary (142) to an amalgamation process (141), wherein both the Time Stamp (139), the Bus Phase (140) and the Data Summary (142) are amalgamated as the Captured Data (121) in FIG. 4 and transmitted to the PFU (117)

The PFU (117) is a programmable component enabling a user to specify different levels of analysis of the data acquired from the SCSI bus. Such analyses can range from basic monitoring of the SCSI bus to monitoring for a range of user-specified events. Typical PFU filtering options include selectively recording SCSI bus activity according to SCSI ID, triggering on specific commands and recording Contingent Allegiance Conditions (CAC).

Figure 5:
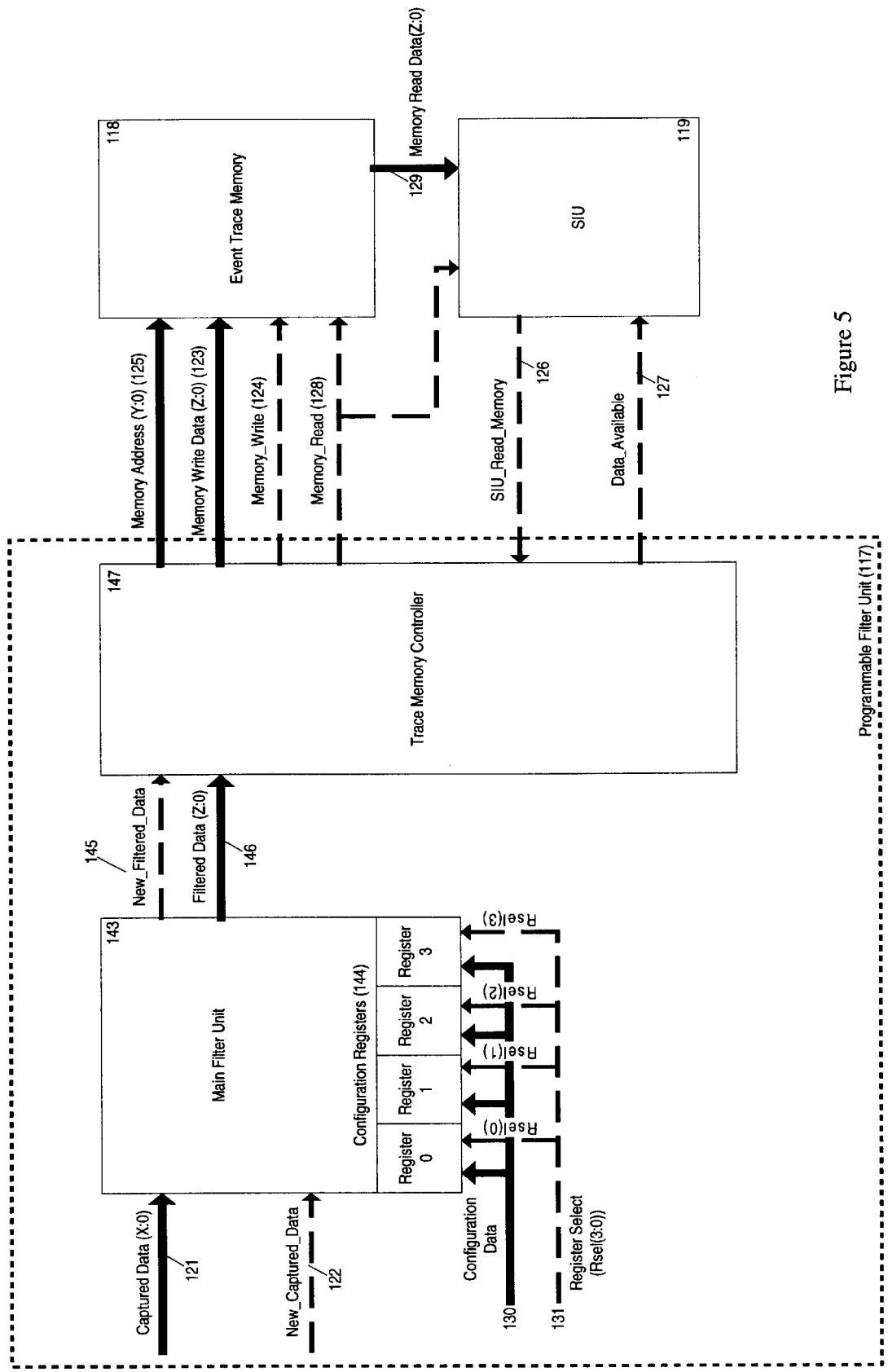
FIG. 5 is a block diagram of the Programmable Filter Unit (PFU) of the SCSI analyser

FIG. 5 shows a more detailed depiction of the PFU (117) wherein it can be seen that the 0:X bits of Captured Data (121) and the New_Captured_Data (122) control signal from the DCU (116) are transmitted to a Main Filter Unit (143). The PFU (117) configuration details, corresponding to the user specified filtering options are entered into Configuration Registers (144) of the Main Filter Unit (143). In FIG. 5 the Main Filter Unit (143) is shown as having four configuration registers, this is to be considered as an example and should in no way limit the scope of the invention. The registers are configured by means of Configuration Data (130) and Register Select control signals (131).

0:Z bits of data (not necessarily equal to X) resulting from this filtering process are transmitted as Filtered Data (145) along with a New_Filtered_Data (146) control signal to a Trace Memory Controller (147). The Trace Memory Controller (147) serves two purposes, firstly to receive the Filtered Data (145) from the PFU (117) and pass it to the Event Trace Memory (118) and secondly to take data from the Event Trace Memory (118) and pass it to the SIU (119).

In terms of the first task, the Trace Memory Controller (147) transmits the filtered data from the PFU (117) to the Event Trace Memory (118) as the Memory Write Data (123). The 0:Z bits of the Memory Write Data (123) are accompanied by the Memory_Write (124) control code and the 0:Y bit address of the memory to which the data is to be written (Memory Address (125)).

In terms of the second purpose for the Trace Memory Controller (147), namely the transmission of data from the Event Trace Memory (118) to the SIU (119), the SIU (119) must wait until it receives a Data_Available (127) control signal from the Trace Memory Controller (147) before it can read data from the Event Trace Memory (118). On receiving the Data_Available (127) control signal, the SIU (119) sends a SIU_Read_Memory (126) control signal to the Trace Memory Controller (147) to signal its intent to read data from the Event Trace Memory (118). The Trace Memory Controller then transmits a Memory_Read (128) control code to the Event Trace Memory (118) (to initiate the data transfer process) and to the SIU (119) (to inform it of the presence of incoming data) and the data is subsequently transferred to the SIU (119) as the 0:Z bits of Memory Read Data (129). The purpose of this control of the transmission of data between the Event Trace Memory (118) and the SIU (119), is to enable the Event Trace Memory (118) to store bursts of data during periods of activity on the SCSI bus (2) (arbitration and data transfer etc.) and then using periods of reduced SCSI bus activity to transmit the data to the SIU (119). The SIU (119) having received the parallel data, transmits it serially to the SES processor (7).

While the above embodiment refers to a SCSI analyser which cooperates with an environmental monitoring and control processor which supports the SCSI Enclosure Services (SES) protocol, it should be recognised that the invention is not limited to the analysis of a parallel SCSI bus, but instead, could also be applied to analysing, for example, a fibre channel medium and Fibre Channel-Arbitrated Loop (FC-AL) activity.

The operation of such a fibre channel analyser 70, FIG. 1, is described in co-pending application entitled "Fibre Channel Diagnostics in a Storage Enclosure" naming Aedan Diarmuid Cailean Coffey et al. as inventors, now pending as U.S. appl. Ser. No. 09/900,213, filed Jul. 6, 2001, published Apr. 18, 2002 as U.S. 20020046276 where, as can be seen in FIG. 1, the fibre channel analyser communicates with the SES Processor 7 via a secondary communication bus, such as an SPI, I$_2$C or other suitable bus to relay data and to receive commands from the SES Processor which in turn communicates with a host processor using, for example, the SES protocol.

Furthermore, as will be appreciated by those skilled in the art, the SCSI protocol can also be employed over a fibre channel medium, and as such the functionality of both the SCSI analyser 5 and fibre channel analyser could in fact be integrated into a single device communicating with a processor 7 over a secondary communication bus, separate from the bus being analysed.

What is claimed is:

1. A bus analyser for analysing the operation of a bus to which a plurality of devices are connectable, said devices being operatively coupled to a host device running a host application, said analyser being adapted to be housed in an enclosure which, in use, houses at least one of said devices and comprising:
    means for extracting data from the bus,
    means for processing extracted data; and
    means for communicating processed data to an environmental control and monitoring unit through a secondary communication bus.

2. An analyser as claimed in claim 1 wherein the analyser is a SCSI bus analyser arranged to be included directly within a SCSI enclosure thereby enabling continuous on-line monitoring of the SCSI bus and the provision of an early warning system of SCSI bus performance degradation.

3. An analyser as claimed in claim 1 wherein the analyser is adapted to provide information comprising a limited analysis of the SCSI bus performance.

4. An analyser as claimed in claim 3 wherein said information comprises data indicating which devices on the SCSI bus are most active over a given period of time; rates of data transmission and error messaging.

5. An analyser as claimed in claim 1 wherein the analyser comprises one integrated circuit chip.

6. An analyser as claimed in claim 1 wherein said environmental control and monitoring unit comprises an Enclosure Services processor arranged to communicate with a bus controller through one of a SCSI Enclosure Services (SES) or a SCSI Access Fault Tolerant Enclosure (SAF-TE) protocol.

7. An analyser as claimed in claim 6 wherein said analyser is arranged to receive from said Enclosure Services processor a control page to enable a user to specify the levels of analysis of bus performance required; and to send to the Enclosure Services processor a status page containing processed data results from the analysis performed by the bus analyser.

* * * * *